Feb. 9, 1937.  H. ALLEMANN  2,070,463
DRILLING MACHINE
Filed Nov. 15, 1935
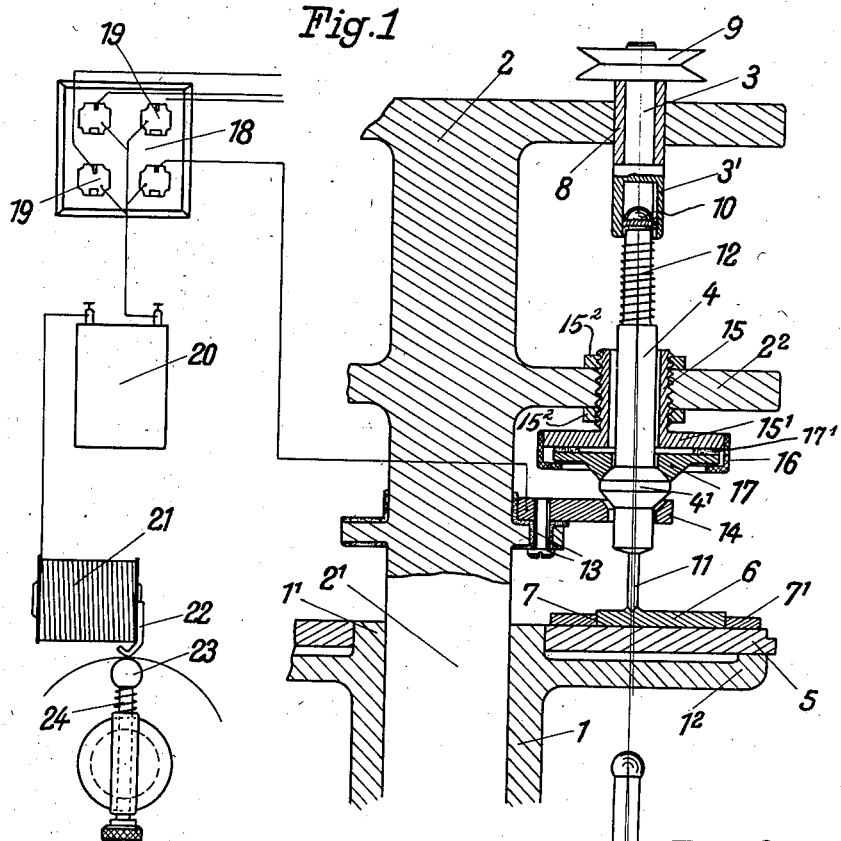
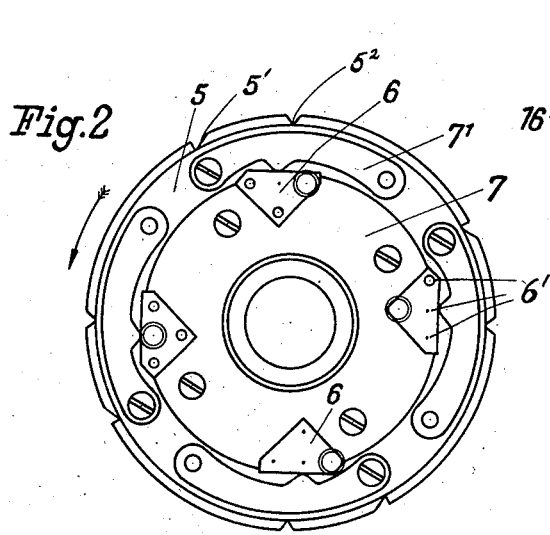
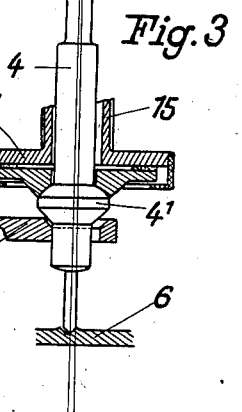
Inventor:
Hugo Allemann
By Fuchs Appleman
Attorney Patented Feb. 9, 1937

2,070,463

UNITED STATES PATENT OFFICE 2,070,463

DRILLING MACHINE

Hugo Allemann, Bettlach, Switzerland

Application November 15, 1935, Serial No. 50,049
In Switzerland January 6, 1934

8 Claims. (Cl. 77—5)

This invention relates to a drilling machine having one or several simultaneously operating tools.

One of the objects of the invention is to provide a drilling machine, wherein each spindle is controlled by a movable self-adjusting guide in such a way that the drill on touching the work assumes a position adapted to the center point thereof and on being lifted off of the work returns to its normal vertical position.

Another object of the invention is to insure automatic stopping of the machine in case of wrong adjustment of the drill and deviation of the spindles from their normal vertical position beyond the permissible limit by causing a control circuit to be closed when the drill is placed on the work and the spindle touches an annular contact member, whereby the machine is disengaged or the vertically movable drill holder or table is locked.

In the known machines the operator himself had to check up from time to time, and it was therefore not possible to prevent the production of faulty pieces having holes not in register with the center point between controls.

By way of example, the invention is illustrated, partly diagrammatically, in the accompanying drawing, in which Figure 1 is a vertical section with parts broken away of the top of a semi-automatic multiple spindle drilling machine showing one of the spindles and a diagram of connections;

Fig. 2, a top view of the table on a reduced scale; and

Fig. 3, a sectional view showing one of the spindles and the thrust bearing therefor.

Referring to the drawing, Fig. 1 shows one of the several spindles. As all of the spindles are identical, it is thought to be sufficient to illustrate and describe but a single one of them. Referring particularly to Fig. 1, 1 is the machine base having a vertical bore, wherein the drill holder 2 is slidingly guided in a longitudinal direction by means of the column 2'. The drill holder 2 is constructed in the form of three superposed discs and is provided with four vertical and irregularly distributed spindles. As aforesaid, but one of the several spindles has been illustrated, each of which comprises substantially a driving part 3 and a member 4 which carries the drill 11. An annular table 5 fits over and is rotatable on the boss 1' upwardly projecting from the base 1 and is supported adjacent its outer edge by the raised rim 1². The table 5 possesses at its circumference four accurately distributed feeding clearances 5' and four additional clearances 5² engaged by a feeding mechanism, not shown, for periodically turning the table 5 in the same direction about its axis to the extent of one quarter. Between these periods of motion a cam engages the clearances 5² and holds the table 5 in position.

On the surface of the table 5 four work pieces 6 are regularly distributed and equally spaced with respect to the axis of the table, each of the work pieces 6 having four center points 6'. The work pieces 6 are guided and held in position by the chuck jaws 7, 7' secured to the table 5.

Each of the four spindles is directed to a point indicated by concentric circles. The non-rotatable drill holder 2, by mechanisms not shown, is periodically moved in axial directions and, during feeding of the table 5, alternately up and down. These mechanisms as well as the table feeding mechanism are actuated by any suitable means, not shown, which carries out a complete rotation of the table 5 for each working period. Owing to these motions, each bit drills a hole at a predetermined point in the previously arranged work, so that a work piece on having passed all four spindles possesses four different bores designated by small circles in Fig. 2. During the four feeding periods the work has, therefore, remained on the machine.

The driving member 3 is rotatably arranged in a bush 8 and provided on top with a cord pulley 9, the bush 8 being pressed into the top plate of the drill holder 2. At its lower part the driving member 3 has a sleeve 3' which receives the spherical top part of the member 4 of the spindle 3, 4 and forms therewith a ball joint. The screw 10, which is secured in the spherical end of the member 4 and which with its outer end engages a longitudinal slot of the sleeve 3', transmits the rotary motion of the driving part 3 to the member 4. The spindle 3, 4 carries at the lower end the drill 11 by any suitable means not shown. Adjacent its lower end the spindle 3, 4 is further provided with the annular boss 4' which is constructed conical below and like a spherical segment on top. By means of the annular boss 4' and under the action of the compression spring 12 and its own weight the spindle 3, 4 rests on the plate 14 formed as a step bearing and insulated relative to the drill holder 2 by the rings 13. There are four of these plates 14 though but one has been shown. The sleeve 15 freely encloses the spindle 3, 4 and is adjustably disposed in the disc 2² of the holder 2 by threads. The sleeve 15 is locked to prevent rotation thereof by means of lock nuts 15². Formed at the lower end of the sleeve 15 is the disc 15' to which a flanged ring 16 is clamped which on its inwardly projecting flange movably carries an additional guide member formed of the disc 17. The top of the disc 17 is provided with an annular rubber covering 17' which serves to space said member 17 from the disc 15'. On its underside the disc 17 has a groove adapted to the top of the annular boss 4' which groove serves as a thrust bearing for the spindle 3, 4. The threaded sleeve 15, together with the disc 17, forms an adjustable stop for the spindle 3, 4. The disc 17 has play in the flanged ring 16 so as to permit displacement on the flange thereof according to the lateral movement of the spindle which has space for slight lateral movement in the plate 14, though less than that which exists between the spindle member 4 and the hollow sleeve 15, so that the spindle 4 is not prevented from touching the plate 14. The three other spindles are constructed likewise.

The board 18 is fitted with four electric drop indicators 19, each of which is electrically connected to a different plate 14 of the four spindles and all of which are jointly connected to a source of current 20. The coil 21 is provided with the contact 22 and electrically connected to the second terminal of the current source 20. To the operating means, not shown, an electric contact 23, not insulated against the machine, is secured, which describes a circle owing to the rotation of the operating means and, by the action of the spring 24, at each rotation touches the contact 22, which is effected when the holder 2 pushes the drills towards the work and the points of the bits are already in contact with the job, as indicated in Figs. 1 and 3.

When the contacts 22 and 23 meet, the circuit covering the spindle 4, the drill holder 2, the contacts 22, 23, the coil 21, the current source 20, the drop indicators 19, and the plates 14 is closed if one of the spindles touches the respective plate 14 (Fig. 3). The closing of the circuit causes an indicator 19 to drop and the coil 21 to release a stopping device, not shown, to stop the machine at once.

The machine described functions as follows:

The spindles are constantly rotating. A work piece 6 is fixed to the table 5, it being assumed that three other like work pieces are already there and partly drilled, according to their position. The operated means is operated for one working period, actuates by the corresponding mechanism the drill holder and pushes it with the drills down towards the work.

If the point of the bit does not exactly meet the center point of the work piece (Fig. 1) but remains within the permissible limits, each spindle 4, owing to its weight and the pressure of the spring 12, will rest on the drill when the point thereof touches the center of the work and the drill holder is further pushed toward it. This pressure, however, does not suffice for drilling a hole. By pushing the drill holder further towards the work pieces the spindle member 3 in the holder is lifted and thus the boss 4' of the spindle member 4 is raised from the plate 14, so that the point of the bit enters the center point and the spindle member 4 is guided only by it, the thrust bearing in the member 17, and the ball joint while the member 4 touches the plate 14 nowhere, as shown in Fig. 1. At this moment the contact 23 rotating with the operating means touches the contact 22 and establishes electric connection between the machine and the source of current 20.

Should a drill be broken or a work piece be already drilled or if no work piece is available, the spindle 4 will be supported in the cone of the plate 14, whereby the circuit is closed and the machine stopped by the stopping device actuated by the coil 21.

If during operation a drill is pushed back into its fixing means and the distance between the bit point and the boss 4' thereby reduced, so that a difference in the depth of the holes is produced, the spindle 3, 4 will not be supported by the drill when the contacts 22, 23 meet but by the boss 4' in the plate 14 whereby the circuit will be closed again.

In the event that the difference between the drilling and center point axes is so great that the play between the spindle 3, 4 and the plate 14 is sufficient to prevent the point of the bit from following the center point (Fig. 3), the spindle member 4 will laterally contact with the wall of the hole of the plate 14, whereby the circuit described will be closed again. This will also happen if the drill does not meet the center, in which case the point of the bit is displaced on the flat work during descent of the drill holder and the spindle 3, 4 is moved towards the wall of the plate 14 to close the circuit.

During further feeding of the drill holder 2 the boss 4' of the spindle 3, 4 lifts the disc 17 from the flange of its supporting ring 16, which is thus guided by the spindle member 4 and then pressed against the disc 15'. The disc 17 then cannot slide any more on the disc 15' and guides by means of the thrust bearing the spindle member 4 until the feed of the drill holder is completed whereupon the disc 17 and the spindle 3, 4 are released again. It is understood that during the actual drilling operation the pressure of the disc 17 against the disc 15 is so great that the spindle 3, 4, as well as the disc 17, is held firmly against lateral or wobbling movement.

In the course of feeding of the drill holder 2 all four spindles or drills will each drill a hole. When the holder is raised again, the table 5 will be fed a quarter turn, so that a working period is finished. If the machine according to the invention is used for counterboring and the countersink does not strike the bore, it will slip off laterally like the point of the bit and the cutting edges disposed on a cone will cause inclination of the spindle member 4. During widening the cutting faces of the drill replace the point of the bit.

If fitted with a reversing gear the machine described can be used equally advantageously for working with shank cutters or tapping.

I claim:—

1. A drilling machine as described, comprising a frame, a drill holder guided in said frame and capable of axial up and down movement, at least one spindle vertically secured to said holder and freely movable at one end and displaceably guided on the other, a drill attached to the lower end of the spindle, a rotatable table connected with the frame for holding at least one work piece having a plurality of center points thereon, and a movable self-adjusting guide for the spindle, said drill on contacting with the work piece being brought by said guide into a working position in one of said center points of the work piece and returned to a normal vertical position on being lifted from the work piece.

2. In a machine according to claim 1 said guide comprising an intermediate bearing automatically adapting itself to the spindle in working positions and guiding it therein, said bearing being held in position by friction due to drilling pressure.

3. In a machine according to claim 1 said guide comprising a thrust bearing for said spindle, a friction member connected with said bearing, and a second fixed friction member, said first friction member being pressed against said second member during operation to guide the spindle.

4. A machine according to claim 1, wherein the spindle comprises an upper fixed driving member and a lower axially displaceable adjustable member connected by a ball joint and the lower member being supported by a funnel-shaped bearing when the drilling pressure ceases.

5. In a machine according to claim 1 means for automatically stopping the machine if the drill is improperly adjusted, said means closing an electric circuit at excessive deviation of the spindle from its normal vertical working position when the drill is placed on the work and the spindle touches an annular contact member limiting the permissible inclination thereof.

6. In a machine according to claim 1 means for automatically stopping the machine if the drill is improperly adjusted, said means closing an electric circuit at excessive deviation of the spindle from its normal vertical working position when the drill is placed on the work and the spindle touches an annular contact member limiting the permissible inclination thereof, and said annular contact member comprising a supporting bearing for the spindle.

7. In a machine according to claim 1 means for automatically stopping the machine if the drill is improperly adjusted, said means closing an electric circuit at excessive deviation of the spindle from its normal vertical working position when the drill is placed on the work and the spindle touches an annular contact member limiting the permissible inclination thereof, said annular contact member comprising a supporting bearing for the spindle and said contact member making an automatic contact with said spindle when the drill is first placed on the work.

8. In a machine according to claim 1 means for automatically stopping the machine if the drill is improperly adjusted, said means closing an electric circuit at excessive deviation of the spindle from its normal vertical working position when the drill is placed on the work and the spindle touches an annular contact member limiting the permissible inclination thereof, a board connected in said circuit, and at least one electric drop indicator on said board, said indicator being adapted to be actuated when said spindle touches said annular contact member.

HUGO ALLEMANN.